United States Patent [19]

Kuzma

[11] Patent Number: 5,389,965
[45] Date of Patent: Feb. 14, 1995

[54] VIDEO TELEPHONE STATION HAVING VARIABLE IMAGE CLARITY

[75] Inventor: Andrew J. Kuzma, Carmel, Ind.

[73] Assignee: AT&T Corp., Murray Hill, N.J.

[21] Appl. No.: 41,110

[22] Filed: Apr. 1, 1993

[51] Int. Cl.$^6$ ............................................. H04N 7/14
[52] U.S. Cl. ...................................... 348/14; 348/17; 348/19
[58] Field of Search ............... 348/14, 136, 17, 19; 358/136

[56] References Cited

U.S. PATENT DOCUMENTS

| | | | |
|---|---|---|---|
| 4,302,775 | 11/1981 | Widergren et al. | 358/136 |
| 4,385,363 | 5/1983 | Widergren et al. | 364/725 |
| 4,394,774 | 7/1983 | Widergren et al. | 382/56 |
| 4,485,400 | 11/1984 | Lemelson et al. | 358/85 |
| 4,541,012 | 9/1985 | Tescher | 358/133 |
| 4,703,350 | 10/1987 | Hinman | 358/133 |
| 4,704,628 | 11/1987 | Chen et al. | 358/136 |
| 4,727,422 | 2/1988 | Hinman | 358/133 |
| 4,827,338 | 5/1989 | Gérard | 358/136 |
| 5,130,792 | 7/1992 | Tindell et al. | 358/85 |
| 5,164,828 | 11/1992 | Tahara et al. | 358/136 |
| 5,164,980 | 11/1992 | Bush et al. | 348/17 |

Primary Examiner—Curtis Kuntz
Assistant Examiner—S. Craig Taborsky
Attorney, Agent, or Firm—Michael A. Morra

[57] ABSTRACT

Video telephone apparatus for transmitting video information over a limited bandwidth communications channel includes a source of video frames which are compressed to reduce the amount of redundant information, and to reduce the level of detail according to a user-selected control signal. The video frames are presented to the compressor at a rate which is varied in order to maintain a constant rate data signal at the compressor's output. As the level of detail is decreased the frame rate is correspondingly increased, thus providing the user with the ability to trade off between image clarity and smoothness of motion. Such tradeoffs are useful when the bandwidth of the communications channel is severely constrained. The control signal is transmitted to the video telephone apparatus from a far-end video telephone over the same channel.

17 Claims, 5 Drawing Sheets

VIDEO TELEPHONE STATION HAVING VARIABLE IMAGE CLARITY

TECHNICAL FIELD

This invention relates to telecommunication apparatus and more particularly to combined audio and video transmission over band-limited facilities.

BACKGROUND OF THE INVENTION

Video telephone service has long been desired by consumers (assuming that marketing studies can be believed) because it enhances the communication process, and by manufacturers (assuming that the profit motive is alive and well) because of the business opportunities presented. Such service was even predicted to be commonplace by the year 2001 according to the Stanley Kubrick film classic "2001—A Space Odyssey" in which an AT&T Picturephone was used to illustrate communication service 30 years in the future. The technical challenge that underlies video telephone service has to do with transmitting a tremendous amount of data over a conventional telephone channel—like filling a large swimming pool with a small garden hose. Figuratively speaking, the Picturephone solution was to use a very large (non-standard) hose which was not easily made available to residential customers, and too expensive when it was.

Over the past twenty years, advances in communications have made it possible to transmit at very high data rates over the Public Switched Telephone Network (PSTN), and advances in data compression have enabled the transmission of audio and video information with much less data than was originally thought necessary. Nevertheless, each PSTN channel only provides approximately 3300 Hz bandwidth which is tolerable for audible communications (20,000 Hz bandwidth is typical for high fidelity sound systems); but when video information (normally 4,000,000 Hz bandwidth) is added, the mere consideration of a PSTN channel for the task of transmitting both would be in the realm of fantasy. Indeed, it may never be possible to duplicate the quality of conventional broadcast television which consumers now expect, but it may be acceptable to reduce the size of the video screen, picture resolution, and frame rate in order to provide a video telephone product that connects to standard telephone lines. Unfortunately, even reducing all of the above leads to a result which many customers are still not comfortable with—particularly when the cost is substantially higher than a telephone set.

Conventional television sets update an entire video picture with a new "frame" 30 times per second, and each frame is subdivided into two fields which are alternately displayed. Accordingly, 60 fields per second are presented to the viewer, each having half the information of the full frame. Because these fields are interlaced, and because the information between adjacent lines is quite similar, a visual effect known as "flicker" is virtually eliminated. However, because them is only a small amount of motion during a video telephone conversation, it is possible to reduce the frame rate while preserving the appearance of continuous motion. Furthermore, video picture size can be reduced because the user is generally close to the video telephone set during a conversation, and the number of picture elements (pixels) required to fill the frame is correspondingly reduced. By taking advantage of the opportunities to reduce picture quality with minimum perceived effect, it is now possible to simultaneously transmit color video pictures and audio information over standard telephone lines. However, the frame rate possible is only in the range of 2-10 frames per second and motion is unnaturally abrupt. Accordingly, more needs to be done to make video telephony acceptable to demanding consumers.

It is, therefore, desirable to provide a video telephone set that operates over standard telephone lines with increased frame rate.

SUMMARY OF THE INVENTION

Video telephone apparatus for transmitting video information over a limited bandwidth communications channel includes a source of video frames which are compressed to reduce the level of detail according to a user-selected control signal. The video frames are presented to the compressor at a rate which is varied in order to maintain a constant rate data signal at the compressor's output. Decreasing the level of detail results in an increase in frame rate, thus providing the user with the ability to trade off between frame rate and video detail.

In an illustrative embodiment of the invention, a conventional telephone line is used as the communications channel which operates in a full-duplex mode. The local video telephone receives the user-selected (FOCUS) control signal from a remote video telephone so that the user who ultimately views the video frames can regulate the quality of such frames according to his/her desires. The FOCUS control signal is used by the local video telephone to vary the amount of spatial filtering, and the amount of normalization of DCT compressed video frames, in order to regulate the high-frequency content of the video frames. This, in turn, causes the frame rate to vary inversely with the high-frequency content of the frames.

In the illustrative embodiment of the invention each video telephone station combines audio, video and supervisory data into a single data stream for transmission. Real-time control over the received picture quality is available at each end via the supervisory channel. Three permanent virtual channels are established, to using X.25 packet data transmission, to organize data transmission according to the LAP-B protocol. The compressor includes a Discrete Cosine Transformer that converts the original video frame into an array of coefficients that represent it in terms of its frequency components. The details that are removed from the original video frames comprise those coefficients associated with the highest frequencies.

BRIEF DESCRIPTION OF THE DRAWING

The invention and its mode of operation will be more clearly understood from the following detailed description when read with the appended drawing in which.

DETAILED DESCRIPTION

Overview

The disclosed video telephone station represents a landmark in the history of telecommunications because it is the first motion, full-color video telephone that works over existing telephone lines. Users can take it home, plug it in and use it! Simultaneous transmission of sound and color, motion video signals is now possible—albeit at a rate of 2–10 video frames per second—over the Public Switched Telephone Network (PSTN). A modulated data scheme is used which incorporates video, audio, and application-specific data streams. Fundamentally, the PSTN characteristics set a limit to the total amount of data that can be transported through the network. Because the available data bandwidth is limited, the video is constrained by two variables, as perceived by the user. First is the image quality and second is the image frame rate. These two variables are inversely proportional, which is to say that a sharper image requires more data and thus has a lower frame rate, while a fuzzy image requires less data and thus has a higher frame rate. The present invention allows the user to choose how to view the far end party—with more clarity, or more motion, or a setting in-between the extremes.

Figure 1:
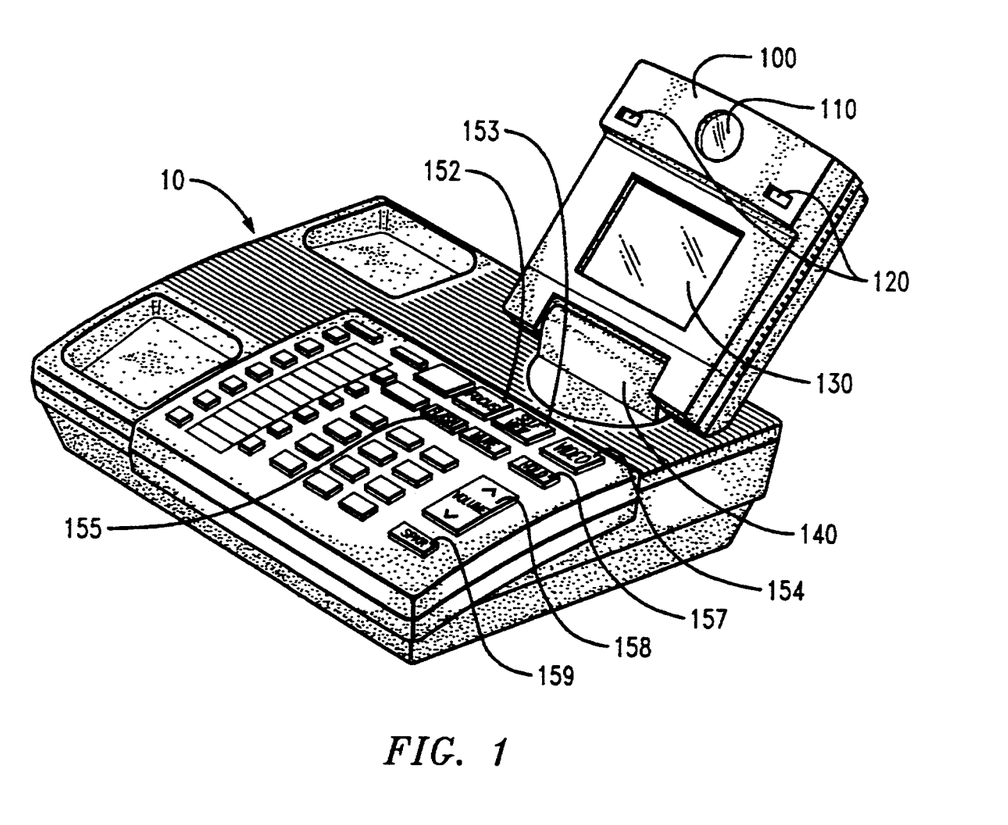
FIG. 1 discloses a video telephone station that combines audio and video signals for transmission over a band-limited communication facility.

FIG. 1 discloses a video telephone station 10 which is intend for use over the PSTN similar to a conventional telephone set. Video telephone station 10 includes all of the equipment needed for making regular telephone calls using a handset (not shown) or a built-in microphone and loudspeaker for hands-free (speakerphone) conversations. The telephone station includes a video module 100 which is mounted on a swivel base 140. Within the module, a video camera 110 obtains an electronic image of whatever is positioned in front of it. This image is transmitted over the PSTN to a distant party. A video screen 130 is located just beneath the camera 110 which is used for displaying the image positioned in front of the corresponding camera of a compatible video telephone station. Swivel base 140 supports video module 100 in a plurality of positions so that the telephone station 10 can remain in a stationary position while the video module is turned to accommodate the location of a subject. Indeed, the swivel base 140 rotates around two axes that are perpendicular to each other. One axis allows the module 100 to be tilted back and forth so that subjects of different height can face the screen directly. The other axis allows the module 100 to be rotated to the left and right so that the subject need not sit directly in front of the telephone station 10 each time he makes a video telephone call. Because the screen 130 and the camera 110 have a fixed position relative to each other, when the subject directly faces the screen he is also directly facing the camera.

A video call is made by first establishing a conventional telephone call with someone having a compatible video telephone station. Shortly into the call, one or both of the parties decide to have a video call, so VIDEO button 154 is pressed on one of the stations. Pressing the VIDEO button causes a data connection to be established between the stations wherein digitally coded audio and video signals are exchanged. Only one side needs to press the VIDEO button to initiate the data connection; however, for privacy reasons, video transmission requires that the VIDEO button be pressed by the person wishing to transmit his/her image. It is, therefore, possible for one station to be transmitting both audio and video while the other station is only transmitting audio. Privacy is further insured by a mechanical shutter (not shown) which can be slid in front of camera 110 to provide peace of mind for those who don't fully trust "electronic gadgetry." A video call is terminated by hanging up; however, to stop sending video images and continue talking, FLASH button 155 is pressed. Either party pressing the FLASH button cancels the picture on both screens 130.

In order for a person to observe his/her transmitted image, a SELF VIEW button 153 is provided for displaying the image presently being transmitted to the distant video telephone station. It is useful for positioning oneself in the center of the transmitted image and, for the narcissist, for continuously viewing themselves during the conversation. Camera view indicators 120 are also useful in this regard because they can only be seen when the subject is out of the camera's field of view. Pressing the SELF VIEW button 153 a second time restores the image from the distant station to the screen 130. When HOLD button 157 is pressed, data signals are sent to the distant station over a supervisory channel. At the local station, pressing the HOLD button terminates the audio, blanks the video, and causes a message "Line on HOLD" to be displayed. At the distant end, audio is terminated, the video image is frozen, and the "Line on HOLD" message is displayed.

Camera FOCUS control 152 adjusts both the sharpness (clarity) of video images and the smoothness of motion observed on the display 130. There are five focus levels. At the highest level, images are the clearest but motion may appear less smooth than normal. At the lowest level, images are less sharp but movements appear more fluid and natural. Image clarity is adjusted when the FOCUS button 152 is pressed and the UP or DOWN arrow on the VOLUME control button 158 is also pressed. For example, each time the UP arrow is pressed, clarity is increased by one level but the frame rate is decreased. In the preferred embodiment of the invention, the FOCUS key remotely controls the frame rate transmitted by a video telephone station; however, the present invention contemplates the ability to locally control the frame rate of a video telephone station as well.

Figure 2:
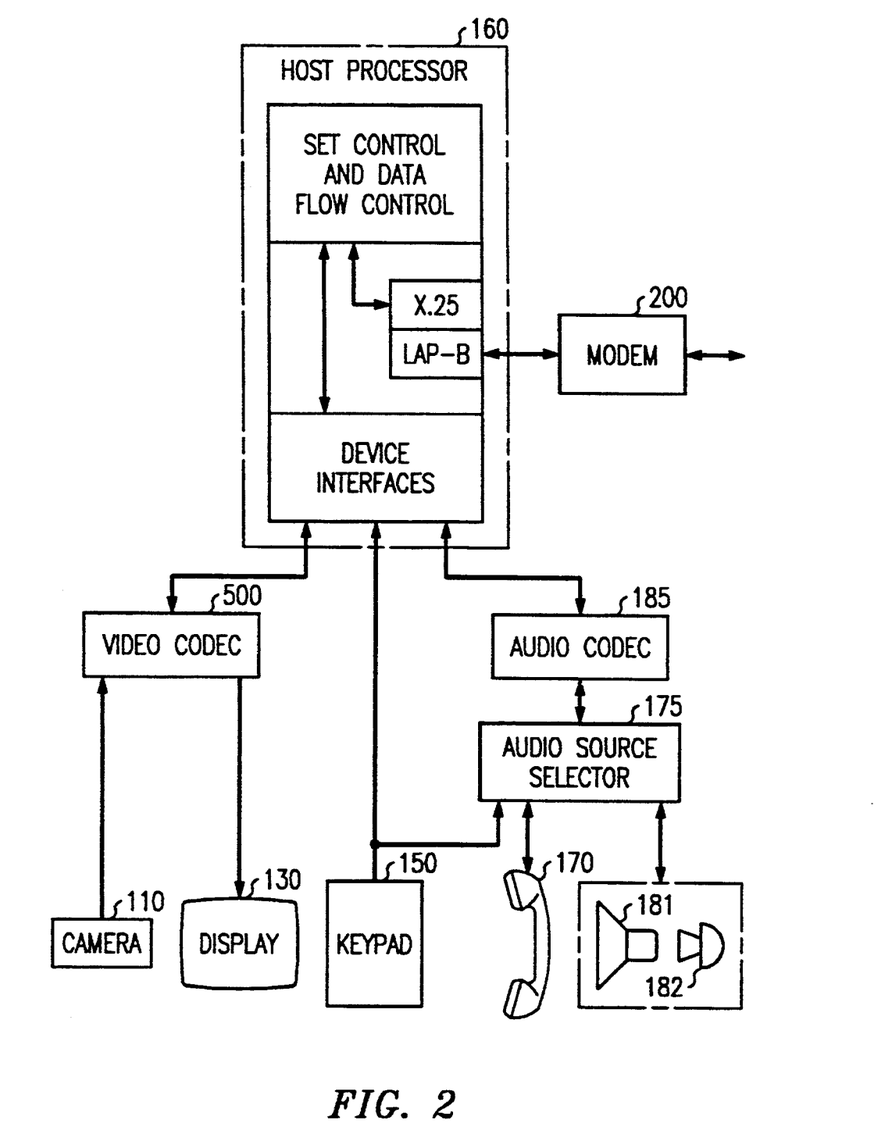
FIG. 2 discloses a block diagram of the video telephone station of the present invention showing its major functional components.

FIG. 2 discloses a block diagram of the video telephone station of the present invention showing its major functional components. Video camera 110 is a charge coupled device such as the CCB-C35T which is commercially available from Sony Corp. Output analog signals from camera 110 are in the Y, R-Y, B-Y format and are presented to a video coder/decoder (codec 500) for compression. In the present invention, in input video frame comprises three arrays: (1) a 128 pixel by 112 line array of "Y" luminance values, each pixel being represented by 6 bits; (2) a 32 block by 28 block array of "R-Y" chrominance values, each block being represented by 6 bits; and (3) a 32 block by 28 block array of "B-Y" chrominance values, each block being represented by 6 bits. What is being done here is that luminance information (64 gray levels between black and white) is transmitted for each pixel, but color information is only transmitted in blocks whose size corresponds to a 4 pixel by 4 line array. A complete input frame is therefore defined by 96,768 bits. Fortunately, image information is redundant so each video image can be defined in less than 2500 bits, on average. This reduction in information relies on coding the information in such a manner that it remains intelligible to a viewer. Compression is the process in which the amount of data used for conveying information is reduced—preferably by the removal of redundant or non-essential information. In the case of video information, for example, there may be large regions of an image which contain identical pixels. One compression technique takes advantage of the fact that it takes less data to collectively describe such regions than it does to describe each pixel separately. In addition to coding regions of the video frame, it is also possible to take advantage of the fact that there are only minor changes from frame to frame. This is particularly true during face-to-face communication where there is little motion. Accordingly, video codec 500 performs coding on the transmitted video signal and decoding of the received video signal. A video codec, suitable for use in the present invention, is the Cameo Personal Video System Model 2001, using the CLI PV2 algorithm, which is commercially available from Compression Labs, Incorporated. Video signals, received from the distant video telephone station, are decoded by codec 500 and displayed on video display 130.

Audio information is available either through telephone handset 170, or a speakerphone comprising loudspeaker 181 and microphone 182. Audio source selector 175 responds to actuations of SPKR key 159 (see FIG. 1) on keypad 150 to route audio signals appropriately. Just as it is advantageous to compress video information, it is also advantageous to compress audio information. In the transmitting direction, audio codec 185 responds to analog input signals from either handset 170 or microphone 182 and converts same into a coded digital output signal at 6.8 kb/s. Similarly, in the receiving direction, digital input information at the 6.8 kb/s rate from host processor 160 is decoded into an analog output signal. The coding and decoding process are complementary.

Data Communication

Communication proceeds between video telephone stations via bidirectional digital data signals that are transmitted between modems associated with each video telephone station (see e.g., FIG. 2) at a data rate of 19.2 kb/s. The digital data signals comprise video, audio and supervisory data which are organized into separate identifiable packets but are combined into a single digital data stream. Three permanent virtual circuits exist between the video telephone stations, one for each type of data being transmitted, each operating at its own data rate. The digital data is converted into an analog signal by modem 200 for transmission over the PSTN. Packet identification (i.e., video packet, audio packet or supervisory packet) as well as flow control and error detection information are handled by a known communication protocol.

Communication Protocol

Figure 4:
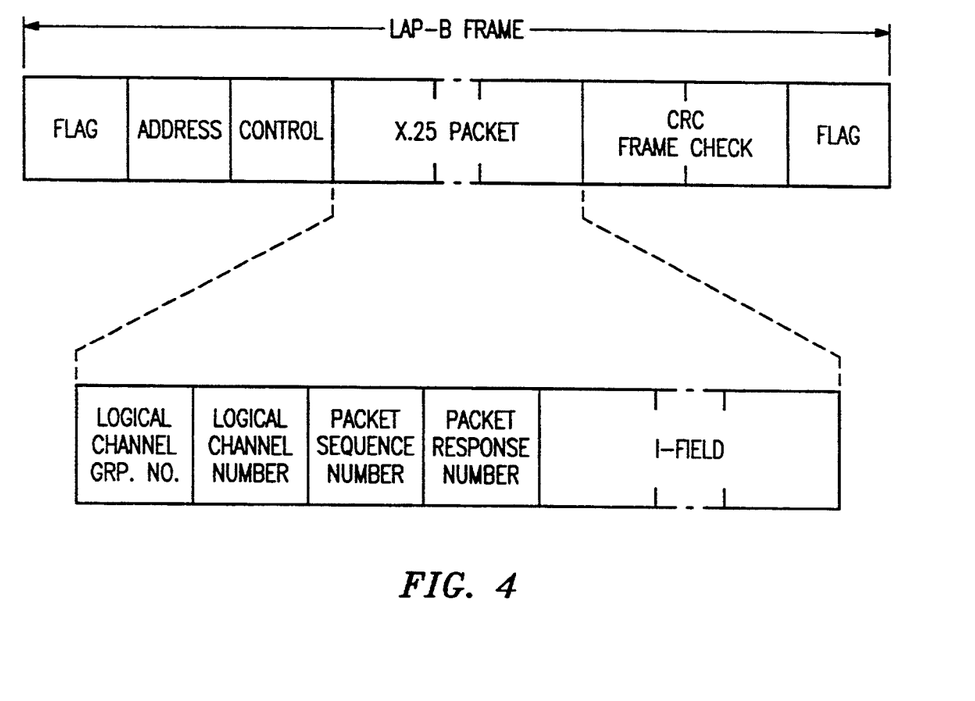
FIG. 4 illustrates a LAP-B information frame used in the communication protocol of the present invention.

The video telephone station uses a communications protocol known as X.25 to specify an "interface" between Data Terminal Equipment (DTE) and Data Communications Equipment (DCE). The DCE provides access to a packet-switched network. X.25 specifically calls out the physical level, the link level, and the packet level. It is noted that because the X.25 standard was developed prior to the Open Systems Interconnect (OSI) model, its does precisely equate with levels 1–3 of the OSI model. Nevertheless, at the physical level, the physical level portion of X.21 (another known standard) is specified. At the link level, a Single Link Procedure known as LAP-B is used which is a subset of the asynchronous balanced mode of HDLC. FIG. 4 illustrates a LAP-B frame having an information field that comprises a plurality of X.25 packets.

Briefly, X.25 was originally approved as a protocol standard in 1976 and provides flow control, error control and multiplexing of data packets. X.25 specifies that the network must support a maximum user field length of at least 128 octets (i.e., the user data field may be some number of bits up to the maximum). In addition, the network may allow selection of some other maximum field length in the range 16 to 4096 octets. The DTE constructs control packets and encapsulates data in data packets. These are then transmitted to the DCE in LAP-B. Perhaps the most important service provided by X.25 is multiplexing. A DTE is allowed by its DCE to establish up to 4095 simultaneous virtual circuits with other DTEs over a single physical DTE-DCE link. In the present invention, only three virtual circuits are needed—video, audio and supervisory. The virtual circuit service of X.25 provides for two types of virtual circuit: virtual call and permanent virtual circuit. A virtual call is a dynamically established virtual circuit using a predetermined call setup and call clearing procedure. A permanent virtual circuit, such as used in the present invention, is a permanent, network-assigned virtual circuit. Data transfer occurs as with virtual calls, but no call setup or clearing is required. Because X.25 is a known standard, further discussion is omitted for brevity. Specific details regarding X.25 can be found in *Data and Computer Communications*—Second Edition by William Stalling, Ph.D., Copyright 1988, Macmillan Publishing Company at pages 423–437.

Information Flow

Figure 3:
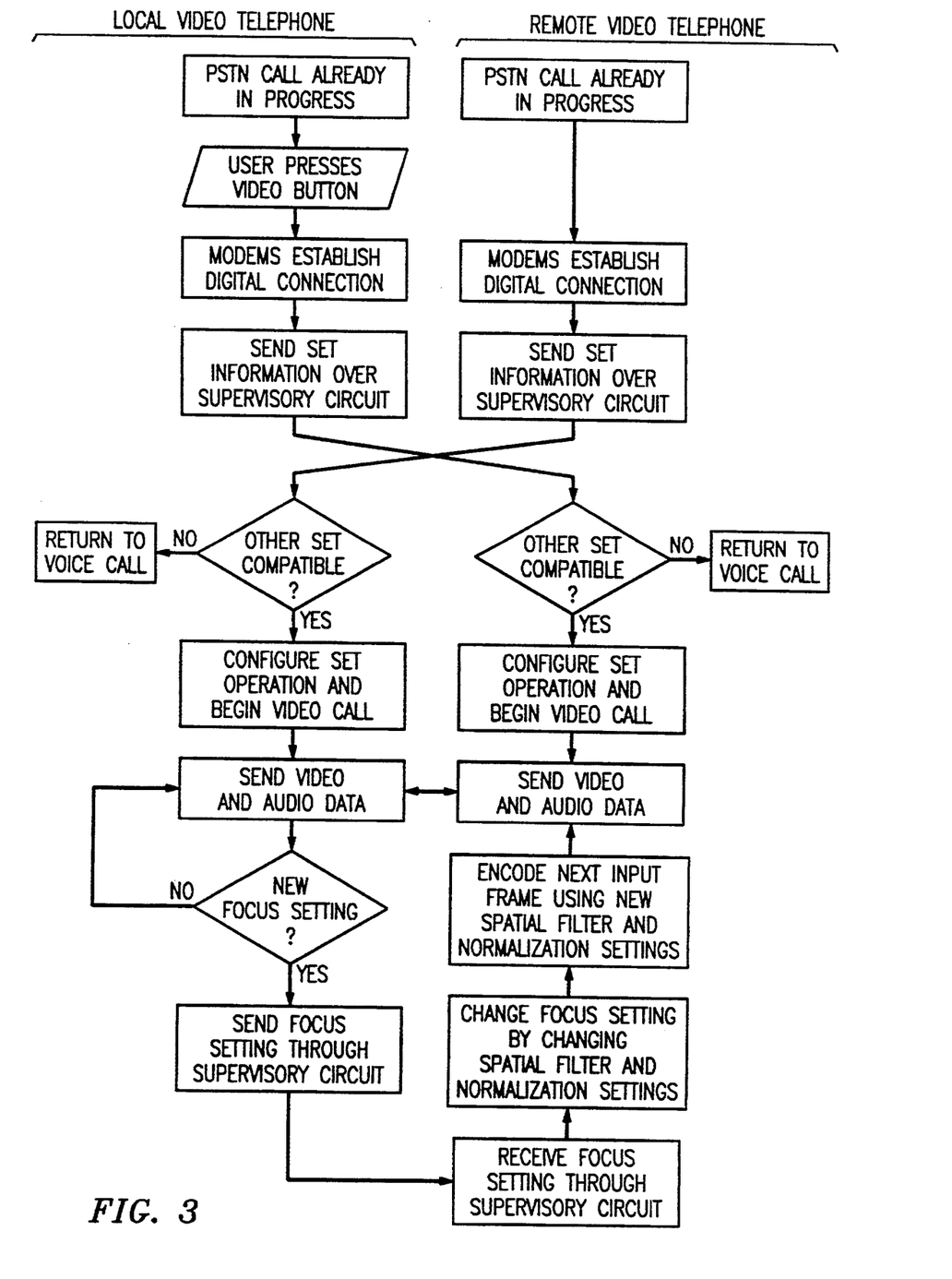
FIG. 3 is a flow chart of steps taken during video telephone communication including the sending and receiving of supervisory messages.

Referring briefly to FIG. 3, a flow chart of the steps taken during a video telephone conversation is shown. In particular, FIG. 3 illustrates the manner in which the user at a local video telephone is able to control the image clarity and video frame rate of a remote video telephone. The video telephone includes FOCUS key 152 and VOLUME key 158 (see FIG. 1) to control the tradeoff between image clarity and frame rate as generally discussed in the Overview section above. Recall that a conversation between video telephone users proceeds as a conventional telephone call until the users press the VIDEO button—at which time a full-duplex (simultaneous bi-directional) permanent virtual circuit is established over the telephone line at 19.6 kb/s. Data transmission over this circuit is discussed in connection with FIG. 4 below. Nevertheless, supervisory information is exchanged between the video telephones which determines compatibility and then the configuration to be used. When the modem connection has been made, the sets exchange a Supervisory Start Up Message mode of the component Information Fields which identifies the capabilities of the local video telephone to the remote video telephone. Included in the Start Up Message is (1) video codec version information, (2) audio processor version information, (3) modem version information, and (4) Supervisory Circuit information. This information is used to negotiate the operational characteristics of the video telephone performance.

FOCUS control information is transmitted as a supervisory packet (i.e., the supervisory virtual circuit), which is extracted by the host processor of the remote video telephone and used to change the spatial filter and normalization settings. Such changes cause the image clarity of the frames, transmitted by the remote video telephone, to become more/less sharp, and the frame rate to correspondingly decrease/increase.

FIG. 4 shows the structure of a LAP-B frame such as used in the present invention to transmit data at the 19.2 kb/s rate. Each frame includes flags at the beginning and end of the frame comprising 1 byte of frame delimiting information. The address block comprises 1 byte of user identification information, and the X.25 Packet block includes a plurality of packets that contain either video, audio or supervisory information. The particular kind of information carried is indicated by a logical channel group number (1 byte) and a logical channel number (1 byte). A packet sequence number is associated with each packet so that if errors are detected, the packet can be inserted into its correct position in a data buffer. Similarly, a packet response number comprises the sequence number of a received packet and whether it was acceptably received. The information field (I-Field) of the X.25 packet comprises either audio, video or supervisory data. In the situation where FOCUS data is transmitted, two bytes are used—the first byte indicates that FOCUS control information is being transmitted, and the second byte provides the new setting. After the X.25 packet is transmitted, two bytes of frame check information (a Cyclic Redundancy Code) are sent for error detection and correction.

Host Processor

In the transmitting direction, host processor 160 combines audio, video and supervisory data into a serial data stream for transmission over the PSTN via modem 200. Raw data from video codec 500 and audio codec 185 are packetized with appropriate identification appended per X.25. Additionally, processor 160 regulates the flow of information using control signals in the reverse direction to make sure that the received data has an acceptable error rate, and it generates frame check information on the data being transmitted. A suitable host processor is the MC68302 which is commercially available from Motorola. In the receiving direction, processor 160 performs the reverse function.

Modem

The voice-band modem used in the video telephone was designed to operate on the domestic switched'network and perform satisfactorily in the presence of its known impairments. It is designed to operate at 19.2 kb/s, but fall back to 16.8 kb/s in the event that errors become excessive. A symbol rate of 3200 baud is selected for the 19.2 kb/s primary speed and 2800 baud is selected for the 16.8 kb/s fallback speed. The majority of connections consist of a local access subscriber loop, a digital long haul connection with a single mu-law encoding, and a local egress loop. The bandwidth of such a connection is essentially limited by the anti-aliasing filter of the mu-law codec. This bandwidth, coupled with a signal-to-quantizing noise ratio greater than 31 dB, easily supports a symbol rate of 3200 baud except when extremely long loops equipped with loading coils (implying severe attenuation distortion above 3200 Hz) are encountered. Since there will always be a small percentage of local loops that contain loading coils (those having a length greater then 18,000 feet), a line rate of 2800 baud was selected to handle that case. The bandwidth of a leaded local loop is more restrictive on the high end of the spectrum by a few hundred hertz compared with the mu-law codec and the modem's carrier frequencies were carefully selected in order to optimally place its line signal within the available bandwidth. A carrier frequencies of 1920 Hz is used for transmission at 3200 baud while a carrier frequency of 1680 Hz is used for transmission at 2800 baud. The modem uses 16-state, 4-dimensional trellis coding which maps 13 bits into two symbols. The modem's signal point constellation contains 92 points for both speeds. The theoretical coding gain is 4.66 dB over an uncoded system.

Video Compression

Figure 5:
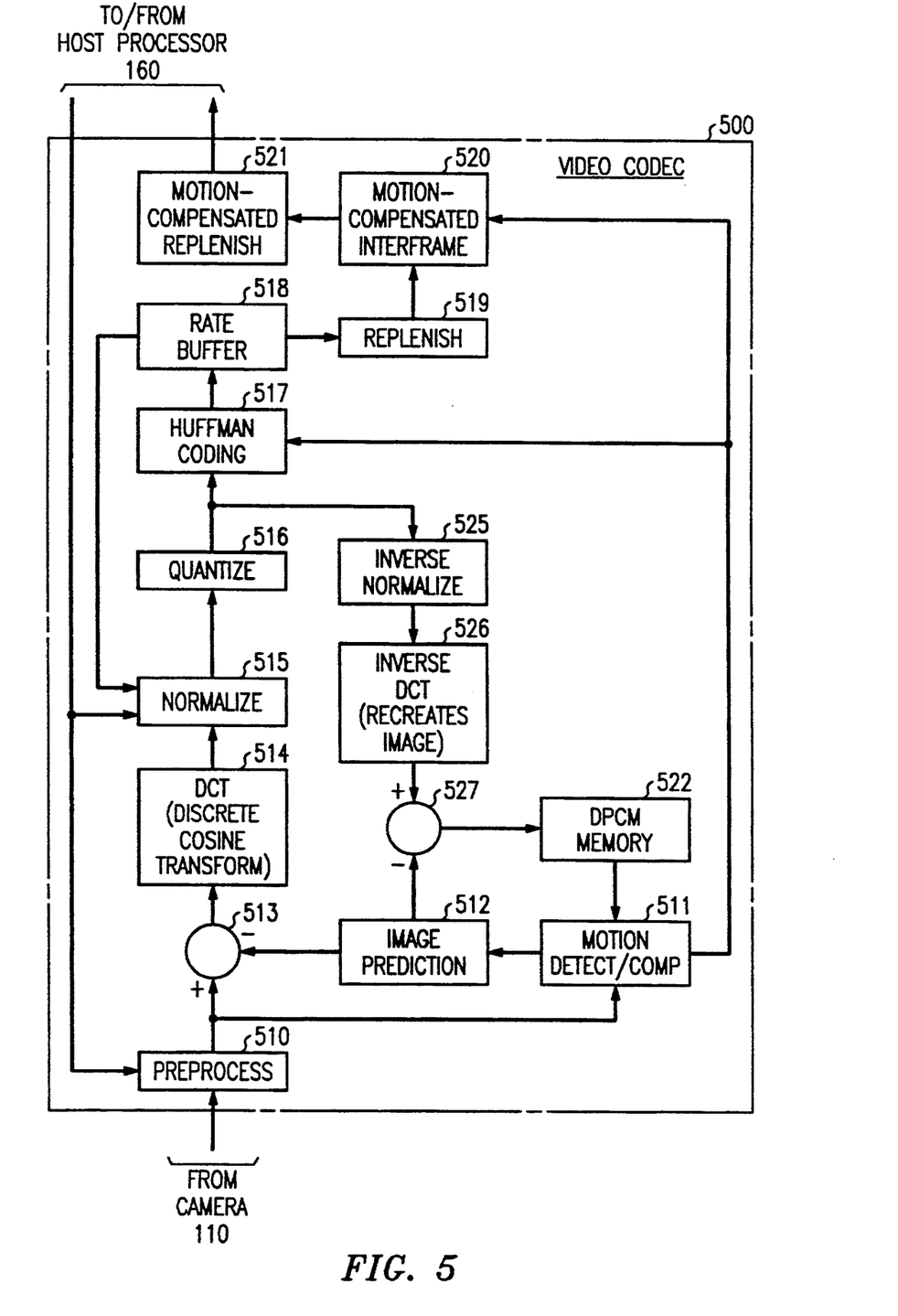
FIG. 5 discloses a motion compensated interframe and intraframe video coding system.

A number of the processes disclosed in FIG. 5 are discussed in great detail in U.S. Pat. Nos. 4,302,775; 4,385,363; 4,541,012; and 4,704,628 which are hereby incorporated by reference. Nevertheless, a brief discussion is provided to acquaint the reader with some fundamental concepts used in video compression. It is noted that a variety of compression techniques are simultaneously used in video codec 500 that cooperate to minimize the amount of data needed to provide a continuous motion, color video image. Each compression technique has as its goal, the reduction of redundant and/or unnecessary information from an original input video frame so that only the minimum amount of data needs to be transmitted to the distant video telephone with an acceptable amount detail and relatively continuous motion. The input to video codec 500 comes from camera 110 which provides video images at the constant rate of 60 frames/second; however, frames are only "grabbed" by the pre-processor 510 as they are needed which, in the present system, is a maximum of 10 frames/second and undertaken only after the predicted image is subtracted from the present video frame (see blocks 512, 513). Pre-processor 510 compares the recently grabbed frame with the previously used frame to determine the amount of change. If insufficient change is observed, then the grabbed frame is discarded and signal is generated saying, in effect, that no change is to be made in the video image being displayed at the distant video telephone. The pre-processor 510 then waits for the next input video image from camera 110, and when an input video image is sufficiently different from the previously used video image (not necessarily the last one received from camera 110), the process of coding the differences commences.

Pre-processor 510 also performs spatial filtering according to an algorithm which is controlled by a FOCUS control signal from the host processor 160. In effect, low-pass filtering of the luminance "Y" signal is achieved by digitally averaging the magnitudes of consecutive pixels. In the simplest case, for example, a digitally filtered frame comprises pixels whose "Y" values are computed by arithmetically averaging the "Y" values of adjacent pixels of the input (unfiltered) frame. In the present invention, the FOCUS control signal is received by the host processor from the remote video telephone station and used to increase/decrease the amount of spatial filtering. One FOCUS setting causes 2 adjacent pixels to be averaged, the next FOCUS setting causes 3 adjacent pixels to be averaged, and so forth. This spatial filtering technique removes high-frequency detail from the video frame in what is essentially a digital low-pass filtering operation. Naturally, variations are possible in which certain pixels are given different weight during the averaging process. Nevertheless, increased spatial filtering causes the frame rate to be increased because differences between adjacent frames are decreased; and in a system which transmits differences between video frames, the number of frames transmitted per second will increase in order to maintain a constant output video bit rate. The output of pre-processor 510 to subtractor 513 is a digitally filtered video frame.

Video codec 500 is a motion-compensated, interframe and intraframe coding system in which compression is enhanced by coding the movement of entire blocks of pixels between frames and then transmitting a small amount of data to indicate such movement. The output to host processor 160 consists of two classes of data: (1) interframe coding, and (2) intraframe coding. The interframe coding decides if a region of the image has changed enough from earlier frames to warrant coding and, if so, whether a simple motion vector is enough to describe the change. Intraframe coding continues this decision process to better describe those blocks that have changed more than motion compensation can predict. These two data classes are combined and Huffman coded for a lossless data compression. The total amount of date in the rate buffer 518 is used as a feedback loop to drive subsequent image coding.

Input data to video coded 500 comprises analog components in Y, R-Y, B-Y format from camera 110 along with horizontal and vertical sync information where: Y represents luminance, R represents Red, and B represents Blue. The analog signals are digitized and pre-processed (block 510) with spatial and temporal filters resulting in three separate video frames, one containing luminance and two containing chrominance picture elements (pixels). The luminanee resolution is 128 pixels×112 lines but the chrominance frames are reduced by a factor of four in both the horizontal and vertical dimensions.

The luminanee and chrominance frames are then segmented into 16×16 blocks and injected into the DPCM (differential pulse code modulation) loop shown in FIG. 5. The motion estimator searches for the best sub-pixel offset between the current block and the previous frame that results in a minimum error. The current block is then subtracted from the best matched block in the previous frame to produce the DPCM error block which is then converted to the frequency domain by the discrete cosine transformer (DCT-block 514). It is known in the prior art relating to television image bandwidth compression that cosine transform techniques have yielded reproduced pictures of superior quality at the same and even higher picture data compression ratios than were obtainable with other transforms or techniques. Additional information regarding DCT is discussed in the article entitled "Scene Adaptive Coder," authored by W. H. Chen and W. K. Pratt in the IEEE *Transactions on Communications*, VOL. COM-32, No. 3, pages 225-232 (1984). In discrete cosine transformer 514, the original image undergoes a two-dimensional mathematical transformation, accomplished in software, of an 8×8 pixel block is replaced by an 8×8 block of DCT coefficients, each coefficient including information regarding the frequency content of the row and column. For example (in a one-dimensional cosine transform process), the average magnitude of a line of 8 pixels is contained in the first DCT coefficient; the fundamental frequency of the line of 8 pixels is contained in the next DCT coefficient; the first harmonic of the fundamental frequency of the line of 8 pixels is contained in the next DCT coefficient, etc. In the present invention, a two-dimensional cosine transform process is used which means that each coefficient includes information on a line of 8 pixels plus a column of 8 pixels. Needless to say, the most important information is carried in the DC and low order coefficients, and if the higher order coefficients are eliminated, only the "crispness" of the picture is sacrificed. More information on two-dimensional transformation processes is contained in the textbook *Digital Coding of Waveforms*, at pages 520-523, N. S. Jayant and P. Noll, © 1984 by Bell Telephone Laboratories.

The output of the DCT block 514 is normalized (block 515) and quantized (block 516). The purpose of normalization is to avoid transmitting six bits, for example, to characterize a coefficient when one or two bits will suffice. Accordingly, normalization is the process of limiting the maximum magnitudes of the coefficients to an limited range by multiplying the coefficients by a normalization factor which is generally less than unity. Quantizer 516 enables only those coefficients that exceed a threshold level to be further processed (Huffman coding 517) and sent to the rate buffer 518. Note that subtractor 513 subtracts the predicted image (from block 512) from the pre-processed actual image (from block 510), and only data which changes from frame to frame is subject to normalization in block 515. What this means is that if there is little or no motion, then the DCT coefficients will be small and only a few coefficients will exceed the quantization threshold to be forwarded to rate buffer 518. However, if the stored data in the rate buffer decreases below half-full, the normalization factor is changed to increase the magnitude of the coefficients so that more data will be above the quantization threshold and be sent to the rate buffer. This change in normalization factor leads to an increase in the level of detail (i.e., higher frequency DCT coefficients are now getting through quantizer 516). It is noted that the other input to normalizer 515 comes from host processor 160. This input is crucial in the present invention because it allows the video telephone user to change the range of normalization factors which can be applied to the DCT coefficients. A change in one direction, as discussed above, leads to a general increase in the level of image detail. This, in turn, allows more data to enter the rate buffer 518 and thus slows down the rate at which new video frames can be processed. Accordingly, the frame rate is decreased when the level of detail in increased. Naturally, a change in the other direction leads to an increase in frame rate. Such control over the frame rate may be controlled by the local video telephone user or, as in the preferred embodiment of the invention, from the distant video telephone user who causes a control signal to be sent to the video telephone over the supervisory channel which is detected and delivered to normalizer 515.

Thereafter the remaining non-zero coefficients are run-length encoded (block 517) and placed in the rate buffer ready to be transmitted. Run-length coding constitutes a naturally appropriate technique for exploiting the redundancy in long runs or clusters or bursts of B and W pixels. Rather than transmitting the identity of each pixel, the number of consecutive similar pixels is transmitted. And although run-length coding is best suited to the transmission of black and white images (as is frequently the case in facsimile transmission), it is extendible to gray-level images as well. It is noted that the rate buffer 518 provides an output data stream at a fixed bit rate. Ideally the rate buffer remains half full so that underflow or overflow is avoided. Moreover, there is feedback from rate buffer 518 to normalizer 515 to increase/decrease the normalization factor—much like automatic gain control in an amplifier. This enables a desired variable coding rate for data to be achieved while approaching at all times convergence to an overall desired rate.

The quantized coefficients are then inverse normalized (block 519) and an inverse DCT process (block 519) is performed. The results of this process are then added (block 521) to a predicted result (from block 512) to create a new reconstructed block that is stored to the DPCM reference memory 522. The receiving video telephone station duplicates the same reconstruction path so that both DPCM memories are identical. After a frame of video is received, the blocks are interpolated back to their original resolution and each Y, R-Y, B-Y pixel is transformed into RGB and converted to an analog signal for display on the video screen 130 (see FIG. 2).

Since the channel rate is fixed and the amount of data flowing into the rate buffer is regulated by the normalization process and will vary the severity of the normalization accordingly. When a lot of motion and spatial high frequencies are present, the normalization increases so as to keep the number of bits per frame as constant as possible. The allocated video bandwidth of the disclosed video telephone station is approximately 10 kb/s and the nominal frame rate is 10 frames per second. This yields 1000 bits per frame. When this occurs, the frame rate is reduced so that the rate buffer (block 518) will not overflow. The maximum allowable normalization is controlled by supervisory signals carrying FOCUS information.

Periodically, each block is sent as an intraframe block which prevents the interframe DPCM process from occurring, and the DCT coefficients are sent representing the actual video data. This cleans up reconstruction DPCM memory 522 if any line errors have occurred which would have corrupted the reference memory. The longest that a video artifact will persist due to a line error is 15 seconds due to this periodic refresh of the reference memory.

Although a particular embodiment has been shown and described it is understood that various modifications are possible within the spirit and scope of the invention. These modifications include, but are not limited to, the use of transformation processes other than DCT, the use of transmission media other than telephone lines, increasing the transmitted video frame rate by controls located at the transmitting station, increasing the transmitted video frame rate by decreasing attributes other than the high frequency components of the video signal. For example, color information may be decreased, or eliminated, so that a black-and-white images with smoother motion may be achieved.

I claim:

1. Video telephone apparatus for transmitting digitized video frames over a limited bandwidth medium, said apparatus including:

a source of original video frames, each frame comprising an array of picture elements;

coding means for generating compressed video frames by eliminating certain details from the original video frames, said compressed video frames being generated at a rate that is proportional to the amount of detail removed from the original video frames;

means for receiving a user-selected control signal from the limited bandwidth medium;

means responsive to the user-selected control signal for controllably increasing the rate at which compressed video frames are generated by increasing the amount of detail removed from the original video frame; and means for transmitting the compressed video frames at a constant data rate over the limited bandwidth medium.

2. The video telephone apparatus of claim 1 wherein the coding means further includes means for eliminating redundant information from the original video frame.

3. The video telephone apparatus of claim 1 wherein the limited bandwidth medium comprises the Public Switched Telephone Network.

4. The video telephone apparatus of claim 1 wherein the coding means comprises means for transforming the original video frame into an array of coefficients representing luminance values of the video frame in terms of discrete frequency components.

5. The video telephone apparatus of claim 4 wherein the certain details that are reduced from said original video frames comprise the coefficients representing the highest frequency components of the video frame.

6. The video telephone apparatus of claim 4 wherein the transforming means comprises a discrete cosine transformer.

7. The video telephone apparatus of claim 6 further including a normalizer for limiting the maximum magnitude of the coefficients from the discrete cosine transformer, the normalizer effectively multiplying the coefficients by a normalization factor, and the magnitude range of the normalization factors being selected by the control signal.

8. The video telephone apparatus of claim 7 further including a quantizer, responsive to the output from the normalizer, for excluding coefficients from the compressed video signal whose magnitudes are less than a predetermined threshold.

9. The video telephone apparatus of claim 1 wherein the coding means includes means for averaging the luminance values of two or more adjacent picture elements of the original video frame to form each picture element of a filtered video frame.

10. The video telephone apparatus of claim 9 wherein the coding means further includes means responsive to the user-selected control signal for increasing the number of adjacent picture elements of the original video frame that are averaged to form picture elements of the filtered video frame.

11. A videophone system including local and remote videophone terminals interconnected to each other over a limited bandwidth communications channel, the local videophone terminal comprising:

means interconnected to the limited bandwidth communications channel for receiving a constant rate data signal from the remote videophone terminal;

means for processing the constant rate data signal to generate video frames for presentation on a visual display;

video display means for displaying the video frames;

means responsive to one or more control switches for generating a control signal which regulates the amount of detail present on the video display; and means interconnected to the limited bandwidth communications channel for transmitting the control signal to the remote videophone terminal, the remote videophone terminal comprising:

means interconnected to the limited bandwidth communications channel for receiving the control signal from the local videophone terminal;

camera means for converting input visual image information into output video frames comprising an array of picture elements, said video frames occurring at a predetermined frame rate;

compressor means for processing the video frames to reduce the amount of detail present therein in accordance with the control signal;

means for presenting new video frames to the compressor at a variable rate which is less than the predetermined frame rate, the variable rate being varied to maintain a constant rate data signal at the compressor's output, the variable frame rate being thereby increased as the amount of detail is decreased; and means interconnected to the limited bandwidth communications channel for transmitting the constant rate data signal to the local videophone terminal.

12. The videophone system of claim 11 wherein the limited bandwidth communications channel comprises a single telephone line on the public switched telephone network.

13. A local video telephone station for communication with a distant video telephone station over a limited bandwidth communication medium, the local video telephone comprising:

means for converting input video image information into output video frames which comprise an array of picture elements, the video frames occurring at a predetermined frame rate;

means for receiving a user-selected control signal from the distant video telephone;

compressor means for processing video frames to reduce the amount of redundant information present therein and for varying the level of detail within the video frames according to the user-selected control signal;

means for presenting the video frames to the compressor at a variable rate which is less than the predetermined frame rate, the variable rate being varied to maintain a constant rate data signal at the compressor's output, the variable frame rate being thereby increased as the amount of detail is decreased; and means interconnected to the limited bandwidth communications medium for transmitting the constant rate data signal to the distant video telephone station.

14. The video telephone apparatus of claim 13 wherein the compressor means includes means for averaging the luminance values of two or more adjacent picture elements of the input video frame for averaging same to form luminance values for each picture element of an output video frame.

15. The video telephone apparatus of claim 14 wherein the compressor means further includes means responsive to the user-selected control signal for increasing the number of adjacent picture elements of the input video frame that are averaged to form picture elements of the output video frame.

16. The video telephone apparatus of claim 13 wherein the compressor means includes a discrete cosine transformer, said cosine transformer convening luminance information from a plurality of adjacent picture elements into coefficients denoting the frequency content of said picture elements.

17. The video telephone apparatus of claim 16 further including a norrealizer for limiting the maximum magnitude of the coefficients from the discrete cosine transformer, the normalizer effectively multiplying the coefficients by a normalization factor, and the magnitude range of normalization factors being selected by the control signal.

* * * * *